(12) United States Patent
Lin et al.

(10) Patent No.: US 7,914,861 B2
(45) Date of Patent: Mar. 29, 2011

(54) LIQUID CRYSTAL COMPOSITE AND METHOD FOR PREPARING THE SAME

(75) Inventors: Hong-Cheu Lin, Hsinchu (TW); Wei-Hong Chen, Yilan County (TW); Ling-Yung Wang, Tainan County (TW); Chieh-Yin Tang, Miaoli County (TW); Szu-Fen Chen, Taoyuan County (TW)

(73) Assignee: Chunghwa Picture Tubes, Ltd., Padeh, Taoyuan (TW)

( * ) Notice: Subject to any disclaimer, the term of this patent is extended or adjusted under 35 U.S.C. 154(b) by 114 days.

(21) Appl. No.: 12/396,155

(22) Filed: Mar. 2, 2009

(65) Prior Publication Data

US 2010/0221458 A1    Sep. 2, 2010

(51) Int. Cl.
*C09K 19/52* (2006.01)
*C09K 19/54* (2006.01)
*C09K 19/38* (2006.01)
*G02F 1/133* (2006.01)

(52) U.S. Cl. .................... 428/1.1; 428/1.3; 252/299.01; 252/299.5; 349/181; 349/182

(58) Field of Classification Search ............. 252/299.01, 252/299.5; 428/1.1, 1.3; 349/181, 182
See application file for complete search history.

(56) References Cited

U.S. PATENT DOCUMENTS 5,594,571 A * 1/1997 Hanyu et al. .................. 349/138
7,298,446 B2 * 11/2007 Hou et al. ..................... 349/154

OTHER PUBLICATIONS

Chen et al., "Dopant Effects of Photoreactive SiO2 Nanoparticles on Fast Response LC Materials in Optical Compensated Bend (OCB) Mode Liquid Crystal Displays," 2008 Taiwan Display Conference, Jun. 11, 2008.

* cited by examiner

*Primary Examiner* — Shean C Wu
(74) *Attorney, Agent, or Firm* — Muncy, Geissler, Olds & Lowe, PLLC

(57) ABSTRACT

A liquid crystal composite is provided, which includes a liquid crystal compound and a nanoparticle. The liquid crystal compound is an optically compensated birefringence (OCB) liquid crystal compound. The nanoparticle has at least one acrylic functional group on the main chain or side chain thereof. The nanoparticle is 0.1-2 wt % by weight of the liquid crystal composite.

13 Claims, 1 Drawing Sheet

LIQUID CRYSTAL COMPOSITE AND METHOD FOR PREPARING THE SAME

BACKGROUND OF THE INVENTION

1. Field of the Invention

The present invention relates to a liquid crystal composite, and more particularly to an optically compensated birefringence (OCB) liquid crystal composite.

2. Related Art

In recent years, the technology related to the flat panel display, for example, liquid crystal displays (LCDs), has become mature. The LCDs now have been widely applied to various electronic products, including large-size products that use thin-film transistor LCDs (TFT-LCDs), such as personal computers and notebooks; and small-size products that adopt super twist nematic (STN) technologies, such as personal digital assistants (PDAs), language translation machines, and cellular phones.

Although the LCDs have the advantages of low radiation, small size, light weight, and thin thickness, when a user views an LCD at different angles, the contrast ratio decreases as the viewing angle increases, thus limiting the viewing angle. Moreover, the response speed of commercially available LCD devices is not high enough, such that the displayed dynamic images often become blurred due to image retention. Therefore, there is still an urgent need in the industry to increase the viewing angle and the response speed of the LCDs so as to improve the image quality of the LCDs.

In order to solve the above problems, an optically compensated birefringence (OCB) LCD device has been developed. The display device has the advantages of high response speed and wide viewing angle in an OCB mode, and thus has a great development potential.

However, commercially available OCB LCD devices still have problems. In general, for an OCB LCD device, the liquid crystal molecules are in a splay mode parallel to a panel in the absence of an electrical field, and in a bend mode in a preferred OCB operation situation. In order to let the liquid crystal molecules achieve its bend mode alignment, a certain preset time is needed to enable the liquid crystal molecules to be twisted from the splay mode into the bend mode in position.

While, the driving voltage required for enabling the liquid crystal molecules to be twisted from the splay mode into the bend mode in position and the corresponding response speed still results the delay response for the OCB LCD device.

SUMMARY OF THE INVENTION

Accordingly, in order to solve the above problems, the present invention is directed to a liquid crystal composite, which can improve the response speed of a liquid crystal display (LCD).

In addition, the present invention is also directed to a method for preparing a liquid crystal composite capable of improving the response speed of an LCD.

Moreover, the present invention is also directed to an LCD device, so as to improve the response speed of a conventional LCD.

To achieve the above objectives, an embodiment of the present invention relates to a liquid crystal composite, which includes a liquid crystal compound and a nanoparticle. The liquid crystal compound is an optically compensated birefringence (OCB) liquid crystal compound. The nanoparticle has at least one acrylic functional group on the main chain or side chain thereof.

In this embodiment, the content of the nanoparticle in the composition of a liquid crystal composite is 0.1-2 wt %, based on the weight of the liquid crystal composite.

In this embodiment, the acrylic functional group is of a structure represented by general formula (1).

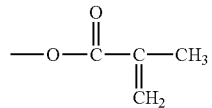

General formula (1)

In this embodiment, the nanoparticle is selected from a group consisting of ZnO, derivatives of ZnO, $SiO_2$, and derivatives of $SiO_2$.

In this embodiment, the liquid crystal composite is applicable to an OCB LCD device.

Another embodiment of the present invention relates to a method for preparing a liquid crystal composite, which includes the following steps. Firstly, a liquid crystal compound and a nanoparticle are mixed. The liquid crystal compound is an OCB liquid crystal compound. The nanoparticle has at least one acrylic functional group on the main chain or side chain thereof. The content of the nanoparticle is 0.1-2 wt %. Secondly, the mixed liquid crystal compound and nanoparticle is filled into a liquid crystal cell. Finally, an energy is provided to initiate a polymerization reaction between the nanoparticle and the liquid crystal compound.

In this embodiment, the acrylic functional group is of a structure represented by general formula (1).

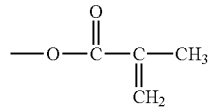

General formula (1)

In this embodiment, the nanoparticle is selected from a group consisting of ZnO, derivatives of ZnO, $SiO_2$, and derivatives of $SiO_2$.

In this embodiment, the filling of the mixed liquid crystal compound and nanoparticle into the liquid crystal cell is by a one-drop filling process or vacuum capillary filling process.

In this embodiment, the energy is an ultraviolet light or an applied voltage.

A further embodiment of the present invention relates to an LCD device, which includes a first substrate, a second substrate, and a liquid crystal layer. The liquid crystal layer is disposed between the first substrate and the second substrate, and has a liquid crystal composite. The liquid crystal composite is formed through a polymerization reaction between a liquid crystal compound and a nanoparticle. The liquid crystal compound is an OCB liquid crystal compound. The nanoparticle has at least one acrylic functional group on the main chain or side chain thereof. The content of the nanoparticle is 0.1-2 wt %.

In this embodiment, the nanoparticle is selected from a group consisting of ZnO, derivatives of ZnO, $SiO_2$, and derivatives of $SiO_2$.

In this embodiment, the LCD device is an OCB LCD device.

When the nanoparticle is added to the liquid crystal compound, liquid crystals can be quickly twisted from the splay mode into the bend mode, so that the LCD device can quickly reach a stable state in the initial drive without using a special high-voltage drive circuit, thus achieving a high response speed (short response time).

In order to make the foregoing features and advantages of the present invention more comprehensible, embodiments will be illustrated in detail below, with reference to the drawings attached.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
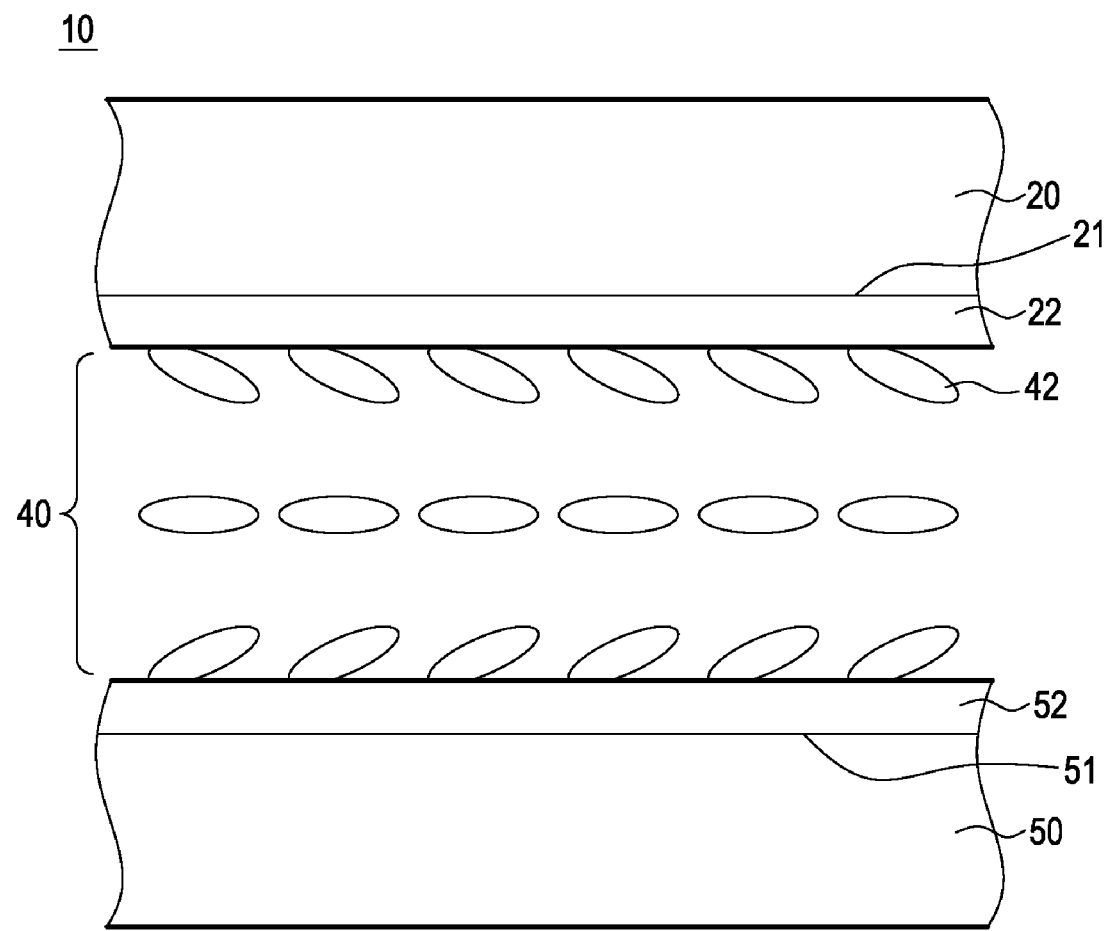
FIG. 1 is a schematic cross-sectional view of an OCB LCD device of the present invention.

In a preferred embodiment, the present invention provides an optically compensated birefringence (OCB) liquid crystal display (LCD) device, which is to synthesize a novel liquid crystal composite through a polymerization reaction. In such a manner, the novel liquid crystal composite can greatly reduce the time and power supply required for transition from the splay mode into the bend mode when the OCB LCD device is initially driven, and can also eliminate the instability between the splay mode and the bend mode, thus achieving a response speed higher than that of a conventional LCD device.

Referring to FIG. 1, an LCD device 10 includes a first substrate 20, a first alignment layer 22, a second substrate 50, a second alignment layer 52, and a liquid crystal layer 40. The first substrate 20 has a first surface 21. The second substrate 50 has a second surface 51. The first substrate 20 is disposed parallel to the second substrate 50, and the first surface 21 faces the second surface 51. The first alignment layer 22 is formed on the first surface 21. The second alignment layer 52 is formed on the second surface 51. The liquid crystal layer 40 is disposed between the first substrate 20 and the second substrate 50, and has a plurality of liquid crystal composites 42. The liquid crystal composite 42 is formed through a polymerization reaction between a liquid crystal compound and a nanoparticle.

A method for preparing the liquid crystal composite includes the following steps. Firstly, a liquid crystal compound and a nanoparticle are mixed. Secondly, the mixed liquid crystal compound and nanoparticle is filled into a liquid crystal cell. Finally, an energy is provided to initiate a polymerization reaction between the nanoparticle and the liquid crystal compound.

In addition, the liquid crystal compound is an OCB liquid crystal compound, the nanoparticle has at least one acrylic functional group on the main chain or side chain thereof, and the acrylic functional group is of a structure represented by general formula (1).

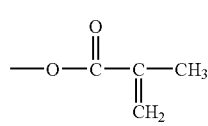

General formula (1)

The nanoparticle is selected from a group consisting of ZnO, derivatives of ZnO, $SiO_2$, and derivatives of $SiO_2$. The content of the nanoparticle is 0.1-3 wt %, based on the weight of the liquid crystal composite.

Table 1 lists several nanoparticles of the present invention that respectively have an acrylic functional group. Referring to Table 1, a derivative of ZnO and a derivative of $SiO_2$ are taken as examples of the nanoparticles.

TABLE 1

| Number | Structure |
| --- | --- |
| 1 | ZnO—(CH$_2$O)$_3$—Si—CH$_2$CH$_2$CH$_2$—O—C(=O)—C(=CH$_2$)—CH$_3$ |
| 2 | SiO$_2$—O—CH$_2$—CH(OH)—CH$_2$O—C(=O)—C(=CH$_2$)—CH$_3$ |

In addition, the filling of the mixed liquid crystal compound and nanoparticle into the liquid crystal cell is by a one-drop filling process or vacuum capillary filling process.

In addition, the liquid crystal compound and the nanoparticle can undergo a polymerization reaction in the presence of light or heat without adding any initiator. The energy may be an ultraviolet light or an applied voltage. In such a manner, phenomena such as image sticking and response delay of the LCD caused by residual initiator are avoided.

Moreover, as compared with a conventional OCB LCD, the LCD device of the present invention has a higher response speed (shorter response time). Comparative embodiments and embodiments are described below.

First Embodiment

Tests were carried out by respectively using pure OCB liquid crystal compound A (ZCE-5096) and liquid crystal compounds B, C, D, E, and F formed by the liquid crystal compound (ZCE-5096) doped with different proportions of reactive semiconductor ZnO nanoparticle as the liquid crystal layer of the LCD device. The structure of ZnO nanoparticle is as shown by Number 1 of Table 1. The particle size of the nanoparticle is 3-10 nm. The pitch of the liquid crystal cell is 3.90 m. The test results are as shown in Table 2.

Referring to Table 2 and Table 3, it can be found that when the nanoparticle is a reactive semiconductor ZnO nanoparticle, the nanoparticle is most preferably doped at 2 wt %. In this case, the response time is shorten from 4.94 ms (mean value) when no nanoparticle is doped to 3.77 ms (doped with 2 wt % ZnO), and the driving voltage is reduced from 1.93 V (mean value) when no ZnO nanoparticle is doped to 1.73 V (doped with ZnO nanoparticle).

TABLE 2

Response speed of ZCE-5096 liquid crystal doped with ZnO nanoparticle

| | ZnO Contents | T on (ms) | T off (ms) | T total (ms) |
| --- | --- | --- | --- | --- |
| A | 0 wt % | 1.22 | 3.72 | 4.94 |
| B | 0.1 wt % | 1.1 | 3.47 | 4.57 |
| C | 0.5 wt % | 0.86 | 3.76 | 4.62 |
| D | 1 wt % | 1.03 | 4.07 | 5.1 |
| E | 2 wt % | 1.16 | 2.61 | 3.77 |
| F | 3 wt % | 0.99 | 3.37 | 4.36 |

TABLE 3

Driving voltage for ZCE-5096 liquid crystal doped with ZnO nanoparticle

| | ZnO Contents | Voltage (V) |
|---|---|---|
| A | 0 wt % | 1.93 |
| B | 0.1 wt % | 1.98 |
| C | 0.5 wt % | 1.85 |
| D | 1 wt % | 1.83 |
| E | 2 wt % | 1.73 |
| F | 3 wt % | 1.85 |

Second Embodiment

Tests were carried out by respectively using pure OCB liquid crystal compound A (ZCE-5096) and liquid crystal compounds formed by the liquid crystal compound (ZCE-5096) doped with different proportions of reactive semiconductor $SiO_2$ nanoparticle as the liquid crystal layer of the LCD device. The structure of $SiO_2$ nanoparticle is as shown by Number 2 of Table 1. The particle size of the nanoparticle is 10-20 nm. The pitch of the liquid crystal cell is 3.90 μm. The test results are as shown in Table 4.

Referring to Table 4, it can be found that when the nanoparticle is a reactive semiconductor $SiO_2$ nanoparticle, the nanoparticle is most preferably doped at 0.1 wt %. In this case, the response time is shorten from 5.06 ms (mean value) when no nanoparticle is doped to 4.32 ms (doped with 0.1 wt % $SiO_2$).

TABLE 4

Response speed of ZCE-5096 liquid crystal doped with $SiO_2$ nanoparticle

| | $SiO_2$ Contents | T on (ms) | T off (ms) | T total (ms) |
|---|---|---|---|---|
| A | 0 wt % | 1.24 | 3.82 | 5.06 |
| B | 0.1 wt % | 1.33 | 2.99 | 4.32 |
| C | 0.5 wt % | 1.27 | 3.08 | 4.35 |
| D | 1 wt % | 1.2 | 3.18 | 4.38 |
| E | 3 wt % | 1.09 | 3.4 | 4.49 |

In the LCD device and the manufacturing method thereof of the present invention, a liquid crystal composition containing a nanoparticle is used to reduce the time and power supply required for transition from the splay mode into the bend mode when the OCB LCD device is initially driven, and eliminate the instability between the splay mode and the bend mode, thus achieving a response speed higher than that of a conventional LCD device. In addition, it can be seen by comparing Table 2, Table 3, and Table 4 that, the LCD device of the present invention surely has a higher response speed, and is thus more competitive than a common OCB LCD device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal composite, comprising
a liquid crystal compound, being an optically compensated birefringence (OCB) liquid crystal compound; and
a nanoparticle, having at least one acrylic functional group on the main chain or side chain thereof, wherein the content of the nanoparticle is 0.1-2 wt %.

2. The liquid crystal composite according to claim 1, wherein the acrylic functional group is of a structure represented by general formula (1)

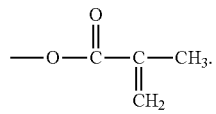

General formula (1)

3. The liquid crystal composite according to claim 1, wherein the nanoparticle is selected from a group consisting of ZnO, derivatives of ZnO, $SiO_2$, and derivatives of $SiO_2$.

4. The liquid crystal composite according to claim 1, wherein the liquid crystal composite is applicable to an optically compensated birefringence (OCB) liquid crystal display (LCD) device.

5. A method for preparing a liquid crystal composite, comprising:
mixing a liquid crystal compound and a nanoparticle, wherein the liquid crystal compound is an optically compensated birefringence (OCB) liquid crystal compound, the nanoparticle has at least one acrylic functional group on the main chain or side chain thereof, and the content of the nanoparticle is 0.1-2 wt %;
filling the mixed liquid crystal compound and nanoparticle into a liquid crystal cell; and
providing an energy to initiate a polymerization reaction between the nanoparticle and the liquid crystal compound, so as to form the liquid crystal composite.

6. The method according to claim 5, wherein the acrylic functional group is of a structure represented by general formula (1)

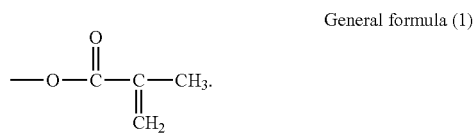

General formula (1)

7. The method according to claim 5, wherein the nanoparticle is selected from a group consisting of ZnO, derivatives of ZnO, $SiO_2$, and derivatives of $SiO_2$.

8. The method according to claim 5, wherein the filling of the mixed liquid crystal compound and nanoparticle into the liquid crystal cell is by a one-drop filling process or vacuum capillary filling process.

9. The method according to claim 5, wherein the energy is an ultraviolet light or an applied voltage.

10. A liquid crystal display (LCD) device, comprising:
a first substrate;
a second substrate; and
a liquid crystal layer, disposed between the first substrate and the second substrate and comprising a liquid crystal composite which is formed through a polymerization reaction between a liquid crystal compound and a nanoparticle, wherein the liquid crystal compound is an optically compensated birefringence (OCB) liquid crystal compound, the nanoparticle has at least one acrylic functional group on the main chain or side chain thereof, and the content of the nanoparticle is 0.1-2 wt %.

11. The LCD device according to claim 10, wherein the acrylic functional group is of a structure represented by general formula (1)

General formula (1)

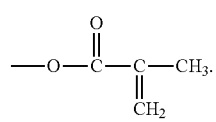

12. The LCD device according to claim 10, wherein the nanoparticle is selected from a group consisting of ZnO, derivatives of ZnO, $SiO_2$, and derivatives of $SiO_2$.

13. The LCD device according to claim 10, wherein the LCD device is an OCB LCD device.

* * * * *